Dec. 28, 1926.  1,612,117
E. M. HEWLETT ET AL
SYSTEM FOR THE TRANSMISSION OF ANGULAR MOVEMENTS
Filed Sept. 15, 1921
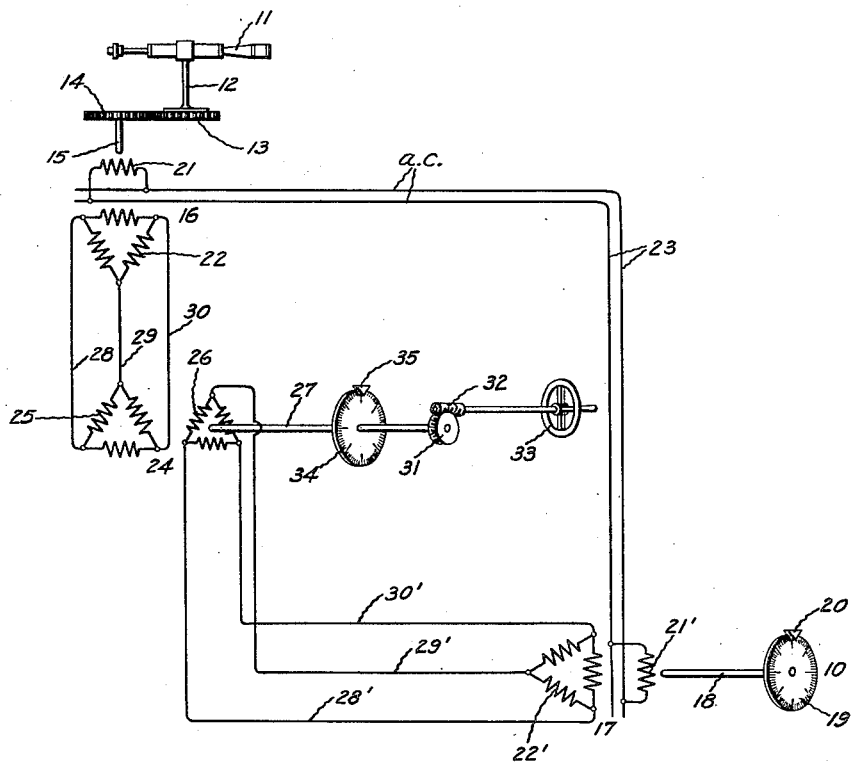
Inventors:
Edward M. Hewlett,
Waldo W. Willard,
by
Their Attorney.

Patented Dec. 28, 1926.

1,612,117

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

SYSTEM FOR THE TRANSMISSION OF ANGULAR MOVEMENTS.

Application filed September 15, 1921. Serial No. 501,007.

Our invention relates to electrical systems for the transmission of angular movement and has for its object the provision of means for introducing changes in the angular relation of the transmitting and receiving devices.

In the transmission of angular movement it is often desirable to change the initial setting between the transmitting and the receiving device. For example, in the transmission of the movements of telescopes, guns, and the like, it is often necessary to introduce corrections of various kinds, such as corrections for deflection, elevation of the gun for range, etc. Such a system is described and claimed, for example, in our copending application Serial No. 503,545, filed September 27, 1921.

More specifically our invention relates to systems for the transmission of angular movement employing alternating current, in which the transmitting and receiving devices are each provided with a single phase or single circuit field winding and a polyphase or polycircuit armature winding, the armature windings being interconnected. Such a system is essentially self-synchronous and is commonly called the "selsyn system." In carrying out our invention in one form, we employ a device designated by the term "selsyn transformer", which we interpose in the connections between the transmitting and receiving devices. The selsyn transformer in one form consists of cooperating rotor and stator members, each provided with a polyphase distributed armature winding, the windings being inductively related to each other. By changing the position of the rotatably mounted winding with respect to the stationary winding, the circuit connecting the transmitting member with the receiving member will be affected by the changing of the phase relations so as to cause the receiving member to lag or lead as desired. In this way any desired correction can be introduced. The selsyn transformer may be located at any convenient point which may be remote from the transmitting and receiving devices.

For a more complete understanding of our invention, reference should be had to the accompanying drawing showing in diagrammatic fashion a system for the transmission of angular movement embodying our invention.

Referring to the drawing, an indicator 10 is controlled in response to movement of the telescope 11 remote therefrom so as to indicate the angular position of the telescope. Movement of the telescope in azimuth about the axis of its supporting shaft 12, which is maintained vertical, rotates a spur gear 13 attached thereto and meshing with a spur gear 14 secured to the rotor shaft 15 of a selsyn generator or transmitting device 16. Preferably the gears 13 and 14 are in a 1:1 ratio so that the rotor shaft will rotate at the same rate as the telescope. The transmitting device 16 controls a similar device 17 remote therefrom, which acts as a motor or receiving device to reproduce the movement imparted to the transmitting device 16 by the telescope. On the rotor shaft 18 of the receiving device 17 is secured the dial 19 of the indicator 10. The dial 19 is graduated in a suitable manner, for example in degrees and minutes of arc. A stationary pointer 20 cooperates with the dial.

The selsyn transmitting and receiving devices are identical in construction. They are provided with single phase field windings 21 and 21' on their rotors and three phase armature windings 22 and 22' on their stators. The single phase rotor windings are excited from a suitable source of alternating current supply 23 to set up fields which interlink with their respective three phase armature windings.

The principal feature of our present invention resides in providing means interposed in the electrical connections between the transmitting device and the receiving device for controlling the movement of the receiving device independently of the transmitting device. The particular means which we have shown comprises a device 24 now known as the selsyn transformer. The selsyn transformer is located at a point remote from the sending and receiving devices and comprises a three phase distributed armature winding 25 on the stator member and a similar three phase winding 26 inductively cooperating therewith and mounted on a rotor member having a shaft 27. Like points of winding 25 of the transformer and armature winding 22 of the transmitting device are interconnected by conductors 28, 29 and 30, while like points of winding 26 of the transformer and armature winding 22' of the receiving device are interconnected by conductors 28', 29' and 30'. Secured to shaft 27 is a worm gear 31 in engagement with which is a worm 32 operated by a handwheel 33. The shaft 27 carries a dial 34, suitably calibrated, and cooperating with the dial is a stationary pointer 35.

Assuming that windings 25 and 26 are in corresponding positions as shown in the drawing, when the stators and the rotors of the transmitting and receiving devices, respectively, are in the same angular relation with respect to each other, the voltages induced in the armature windings are equal and opposite and therefore exactly counterbalance each other. If the rotor of the transmitting device is moved, this balanced voltage condition is disturbed with the result that equalizing currents are set up in the armature windings. The equalizing currents exert a torque on the rotor of the receiving device causing it to follow the movement of the transmitting device to reestablish the balanced condition in the armature windings. The receiving device 17 will therefore reproduce any movement imparted to the transmitting device 16 as long as the transformer windings 25 and 26 remain in a fixed relation. It will be noted that this system for transmitting angular motion operates substantially independently of variations or fluctuations in the voltage of the supply source 23, and consequently the accuracy of the system is not affected by such variations.

Coming now to the function of the selsyn transformer, it will be observed that when the transformer windings 25 and 26 are in similar related positions, as shown in the drawings, any voltages generated in the armature of the transmitting device will be transmitted in their true value and phase relation to the armature of the receiving device, the selsyn transformer acting as a 1:1 transformer. Should, however, the windings be displaced through an angle with respect to each other, then the voltages generated by the transmitting device will be shifted in phase by the transformer by an amount proportional to the displacement of the transformer windings. The receiving member will therefore be affected to rotate indicator 10 through a lesser or a greater angle than the transmitting device was moved through depending on the direction in which the windings of the transformer were displaced. The receiving device can therefore be controlled independently of the transmitting device by moving transformer winding 26 in one direction or the other depending on the direction of the independent movement which it is desired to impart to the receiving device. It will be observed that the amount of movement of the receiving device produced by movement of the winding 26 bears a fixed relation to the movement of the winding 26, this relation being independent of the angular positions of the transmitting and receiving devices.

Assuming the transmitting device and receiving device to be in balanced positions, and the transformer windings to be in corresponding positions, as shown in the drawing, the operation of our invention is as follows: Upon movement of the telescope in azimuth in one direction or the other as the case may be, a like angular movement is imparted to the rotor of the transmitting device causing the rotor of the receiving device to turn to a corresponding position and move the dial 19 until pointer 20 indicates thereon the exact position of the telescope. Should it be desired to introduce any corrections, handwheel 33 is turned in a direction to give the desired angular lead or lag as indicated by pointer 35 on the dial 34. Upon movement of the transformer winding, receiving device 17 moves through the angle of lead or lag as the case may be independently of the transmitting device, but continues to reproduce any movement of the transmitting device as before with the addition of the angle of lead or lag introduced by means of the transformer. Should the corrections be introduced while the telescope is in motion, the effect will be to temporarily speed up or retard receiving device 17 until the correction is made, after which the receiving device will continue to synchronously reproduce the movement of the sending device.

It will be understood that the indicator 10 indicates the actual position of the telescope only when transformer windings 25 and 26 occupy similar related positions so that the rotors of transmitting device 16 and receiving device 17 are in corresponding angular positions with relation to their stators. By means of transformer 24 the position of the indicator can be controlled to introduce corrections, for example, for parallax between the telescope and the indicator, and in case a gun is actuated in accordance with the readings given on the indicator, various corrections for deflection, windage, elevation of the gun for range, etc., can be introduced at a suitable plotting station.

Obviously various applications of our invention other than the specific embodiment herein disclosed can be made in the control of a receiving device independently of its sending device without interrupting the synchronous operating relation between the two devices. Also various polyphase armature windings other than three phase can be used in our selsyn transformer, provided suitable polyphase armature windings are used on the transmitting and receiving devices.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. A system for the transmission of angular motion comprising an electrical motion transmitting device, an electrical motion receiving device, an alternating current source of electrical supply for said devices, electrical connections between said devices and said source whereby said receiving device follows the movements of said transmitting device substantially independently of variations in the voltage of said source, and inductive corrective means included in said connections provided with an element movable to modify the angular relation of said devices.

2. A system for the transmission of angular motion comprising a motion transmitting device provided with relatively movable armature and field windings, a motion receiving device having similar windings, electrical connections between the armature windings of said devices whereby said receiving device is responsive to the movements of said transmitting device, and means forming a part of said connections provided with an element movable to change the angular relation of said transmitting and receiving devices.

3. A system for the transmission of angular motion comprising an alternating current motion transmitting device, an alternating current motion receiving device, an alternating current source of electrical supply for said devices, electrical connections between said devices and said source whereby said receiving device follows the movements of said transmitting device substantially independently of variations in the voltage of said source, inductive means interposed in said connections, and means for varying the inductive effect of said inductive means so as to vary the angular relation of said devices.

4. A system for the transmission of angular motion comprising an alternating current generator constituting a transmitting device, an alternating current motor constituting a receiving device, connections between said devices whereby said receiving device is responsive to the movements of said transmitting device, said connections including inductively related windings electrically connected to said generator and motor respectively, and means for relatively displacing said windings so as to vary the angular relation of said generator and motor.

5. A system for the transmission of angular motion comprising an alternating current motion transmitting device, an alternating current motion receiving device, an alternating current source of electrical supply for said devices, electrical connections between said devices and said source whereby said receiving device follows the movements of said transmitting device substantially independently of variations in the voltage of said source, and an inductive device having cooperating windings interposed in said electrical connections, said windings being relatively movable to vary the angular relation of said transmitting and receiving devices.

6. A system for the transmission of angular motion comprising a motion transmitting device including relatively movable armature and field windings, a motion receiving device having similar windings, electrical connections between the armature windings of said devices whereby said receiving device is responsive to the movements of said transmitting device, and an electromagnetic device forming a part of said connections provided with an element movable to change the angular relation of said transmitting and receiving devices.

7. A system for the transmission of angular motion comprising a motion transmitting device having armature and field windings, a motion receiving device having similar windings, electrical connections between the armature windings of said devices, inductively cooperating windings interposed in said connections, and means for changing the relation of said cooperating windings to control said receiving device.

8. A system for the transmission of angular motion comprising a transmitting device having polyphase armature windings and single phase field windings, a receiving device having similar windings, electrical connections between the armature windings of said devices whereby said receiving device is responsive to the movements of said transmitting device, a source of alternating current for said field windings, polyphase inductively related windings interposed in the connections between said armature windings, and means for changing the relation of said windings to control said receiving device.

9. A system for the transmission of angular motion comprising an alternating current motion transmitting device, an alternating current motion receiving device, an alternating current source of electrical supply for said devices, electrical connections between said devices and said source whereby said receiving device follows the movements of said transmitting device substantially independently of variations in the voltage of said source, inductively cooperating windings interposed in said connections, one of said windings being rotatably mounted, and means for adjusting said rotatable winding to change the angular relation of said devices.

10. A system for the transmission of angular motion comprising a transmitting device including relatively movable polyphase armature and single phase field windings, a receiving device having similar windings, electrical connections between the armature windings of said device, a source of alternating current for said field windings, inductively cooperating polyphase windings interposed in said connections, one of said polyphase windings being rotatably mounted, and means for adjusting said rotatable winding to control the operation of said receiving device without interrupting its operation under the control of said transmitting device.

11. The combination with two objects remote from each other and arranged to be given angular movement, of an electrical transmitting device driven by one of said objects, an electrical receiving device, an alternating current source of electrical supply for said devices, electrical connections between said devices and said source whereby said receiving device follows the movements of said transmitting device independently of variations in the voltage of said supply source, a driving connection between said receiving device and the other of said objects whereby the latter is driven in synchronism with the first, two inductively associated relatively rotatable windings interposed in said connections, and means for changing the angular relation of said windings to control the angular relation of said objects.

12. A system for the transmission of angular motion comprising a transmitting device provided with relatively movable polycircuit armature and single circuit field windings, a receiving device having similar windings, a pair of inductively cooperating polycircuit windings, electrical connections between said windings and said armature windings respectively, the electrical connections between said transmitting and receiving devices being through the inductive relation between said cooperating windings, and means whereby one of said windings may be turned to vary said inductive relation and thereby operate said receiving device independently of said transmitting device.

In witness whereof, we have hereunto set our hands this 14th day of September, 1921.

EDWARD M. HEWLETT.
WALDO W. WILLARD.